United States Patent
Al-Olayan

(10) Patent No.: US 10,435,614 B2
(45) Date of Patent: *Oct. 8, 2019

(54) METHODS AND COMPOSITIONS FOR IN-SITU POLYMERIZATION REACTION TO IMPROVE SHALE INHIBITION

(71) Applicant: SAUDI ARABIAN OIL COMPANY, Dhahran (SA)

(72) Inventor: Abeer Mohammad Al-Olayan, Dammam (SA)

(73) Assignee: Saudi Arabian Oil Company (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,401

(22) Filed: May 16, 2019

(65) Prior Publication Data

US 2019/0270928 A1    Sep. 5, 2019

Related U.S. Application Data

(63) Continuation of application No. 16/057,951, filed on Aug. 8, 2018, which is a continuation-in-part of (Continued)

(51) Int. Cl.
  *E21B 33/138*   (2006.01)
  *C09K 8/514*    (2006.01)
  (Continued)

(52) U.S. Cl.
  CPC ........... *C09K 8/514* (2013.01); *C09K 8/12* (2013.01); *C09K 8/512* (2013.01); *E21B 21/003* (2013.01); *E21B 33/138* (2013.01)

(58) Field of Classification Search
  None
  See application file for complete search history.

(56) References Cited

U.S. PATENT DOCUMENTS 3,213,051 A    10/1965  Pierce
4,498,540 A    2/1985   Marrocco
(Continued)

FOREIGN PATENT DOCUMENTS

EP    0188856 A1    7/1986
WO    2011012921 A1    2/2011
(Continued)

OTHER PUBLICATIONS

International Search Report and Written Opinion for related PCT application PCT/US2016/040503 dated Sep. 30, 2016.
(Continued)

*Primary Examiner* — Angela M DiTrani Leff
(74) *Attorney, Agent, or Firm* — Bracewell LLP; Constance G. Rhebergen

(57) ABSTRACT

A method of modifying an alteration zone of a formation near a wellbore using a non-Newtonian polymeric composition created from a reaction of a non-Newtonian combination comprises the steps of mixing an anhydrous tetraborate and a fluid to create a crosslinker solution, mixing a crosslinkable polyvinyl alcohol and water to create a polymer solution, where the crosslinker solution and the polymer solution form the non-Newtonian combination, pumping the non-Newtonian combination to a reaction zone in the wellbore, where pumping the non-Newtonian combination is configured to induce mixing of the polymer solution and the crosslinker solution, allowing the non-Newtonian combination to react to form the non-Newtonian polymeric composition, allowing the non-Newtonian polymeric composition to migrate to the alteration zone, where the non-Newtonian polymeric composition migrates due to gravity, and allowing the non-Newtonian polymeric composition to interact with the alteration zone to modify the alteration zone.

19 Claims, 6 Drawing Sheets

Related U.S. Application Data application No. 15/200,012, filed on Jul. 1, 2016, now Pat. No. 10,059,868.

(60) Provisional application No. 62/187,533, filed on Jul. 1, 2015.

(51) Int. Cl.
*C09K 8/12* (2006.01)
*C09K 8/512* (2006.01)
*E21B 21/00* (2006.01)

(56) References Cited

U.S. PATENT DOCUMENTS

| | | | |
|---|---|---|---|
| 4,620,596 | A | 11/1986 | Mondshine |
| 5,009,269 | A | 4/1991 | Moran et al. |
| 5,110,484 | A * | 5/1992 | Sheu ............... C09K 8/08 507/110 |
| 5,157,063 | A | 10/1992 | Wetherell |
| 5,252,332 | A | 10/1993 | Goldstein |
| 2003/0008778 | A1 | 1/2003 | Donaldson et al. |
| 2006/0116295 | A1 | 6/2006 | Dobson et al. |
| 2006/0157248 | A1 | 7/2006 | Hoefer et al. |
| 2009/0149354 | A1 | 6/2009 | Dajani et al. |
| 2009/0247430 | A1 | 10/2009 | Fu |
| 2010/0175877 | A1 | 7/2010 | Parris et al. |
| 2010/0210486 | A1 | 8/2010 | Horton et al. |
| 2011/0017457 | A1 | 1/2011 | Samuel et al. |
| 2013/0048282 | A1 | 2/2013 | Adams et al. |
| 2013/0233553 | A1 | 9/2013 | Bugrin et al. |
| 2014/0158354 | A1 | 6/2014 | Kumar et al. |
| 2014/0262281 | A1 | 9/2014 | Kulkarni et al. |
| 2015/0075789 | A1 | 3/2015 | Singh et al. |
| 2015/0083423 | A1 | 3/2015 | Brannon et al. |
| 2016/0122613 | A1 | 5/2016 | Zhou et al. |
| 2016/0272869 | A1 | 9/2016 | Singh et al. |

FOREIGN PATENT DOCUMENTS

| | | |
|---|---|---|
| WO | 2015041679 A1 | 3/2015 |
| WO | 2015126395 A1 | 8/2015 |

OTHER PUBLICATIONS

Angelova et al., "Cosolvent Gel-like Materials from Partially Hydrolyzed Poly(vinyl acetate)s and Borax", ACS Publication, 2011, pp. 11671-11682, American Chemical Society.

* cited by examiner

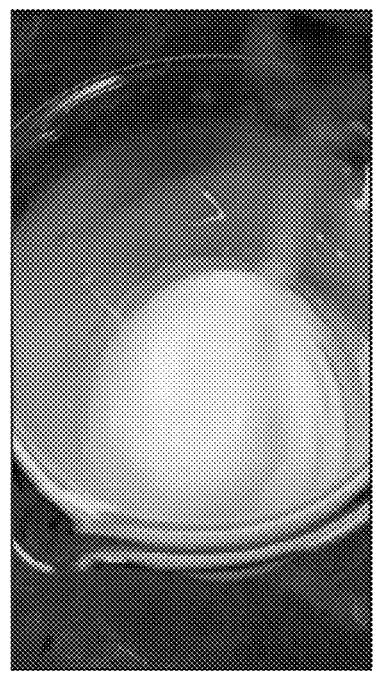
FIG. 12a    FIG. 12b
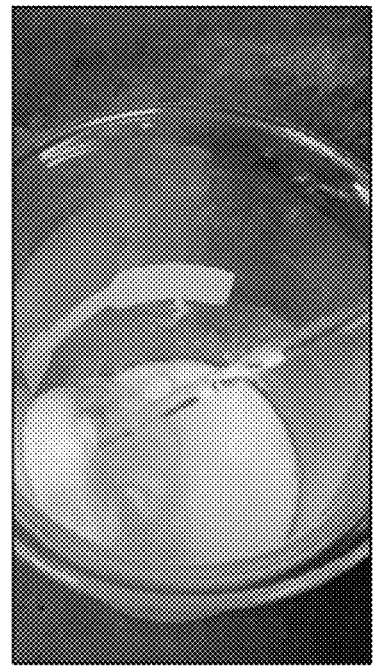
FIG. 12c

METHODS AND COMPOSITIONS FOR IN-SITU POLYMERIZATION REACTION TO IMPROVE SHALE INHIBITION

CROSS REFERENCE TO RELATED APPLICATIONS

This application is a continuation of U.S. patent application Ser. No. 16/057,951 filed on Aug. 8, 2018, which is a continuation-in-part of U.S. patent application Ser. No. 15/200,012 filed on Jul. 1, 2016 and issued as U.S. Pat. No. 10,059,868 issued on Aug. 28, 2018, which claims priority from U.S. Provisional Application No. 62/187,533 filed on Jul. 1, 2015. For purposes of U.S. patent practice, this application incorporates the contents of all of the Provisional Application and the Non-Provisional applications by reference in their entirety.

TECHNICAL FIELD

Compositions and methods are provided for modifying the physical structure of a formation surrounding a wellbore. More specifically, compositions and methods are provided for forming a polymeric composition in a wellbore, where the polymeric composition transforms an aspect of the wellbore formation.

BACKGROUND

There are times during drilling operations, when it is necessary to alter the physical structure of a formation surrounding a wellbore. Examples of such physical alterations include fracturing operations, loss circulation control, and shale formation inhibition. Fracturing operation operations are proactive methods to increase the amount of hydrocarbons recovered from a formation. Conversely, loss circulation control and shale formation inhibition are defensive measure to prevent reductions in recovery.

Loss circulation, a partial or complete loss of drilling fluids into the formation, is a common and expensive problem in drilling operations. Loss circulation causes well control problems and unsafe well control conditions. When whole volumes of drilling fluids are lost into the formation, additional volumes of drilling fluid must be mixed to make-up for the losses. Thus, the occurrence of a loss circulation zone increases the costs associated with drilling the well and results in lost product time.

Loss circulation occurs due to fractures caused by mud weight/pressure, formations with high permeability and porosity, and natural fractures or caverns. In complete loss circulation, the wellbore opens and the pressure exerted by the mud column disappears creating an under balance situation, where the formation fluids enter the wellbore and cause a kick.

To combat loss circulation, lost circulation materials are used to plug the opening in the wellbore. Loss circulation materials can be whole fluids delivered separately to the loss circulation zone, such as cements, or can be fluid additives mixed with the drilling fluids. Conventional fluid additives include chemical reactants and particles that are mixed with the mud, such as husks, fibers, or other solids such as calcium carbonate. Chemical reactants often have delayed reaction pathways, such that the reactants can be mixed in together at the surface, but the reaction does not proceed until the reactants reach the loss circulation zone.

Problems with current lost circulation materials include cement jobs that fail to plug the loss circulation zone and compromise the integrity of the casing requiring future remedial work. Solid additives that are too small to have effect in large loss zones are also a problem. Chemical reactants that react too quickly or too slowly to plug the loss zone are also common problems. Loss circulation materials that require precise placement add to the delay time of drilling. Loss circulation materials which can be efficiently placed and will act to block the entire loss circulation zone are desired.

Shale formations are commonly encountered during drilling operations. Shale contains clay materials, along with other minerals. Water in the drilling fluids interacts with the shale to cause shale swelling, sloughing, and can even lead to well collapse. The shale absorbs water from the drilling fluids and increases in weight and dimension. By some estimates, 70 percent (%) of wellbore instabilities are associated with shale formations. The instabilities pose safety risks and increase well costs.

Shale swelling is usually addressed by adding shale inhibitor materials to the drilling fluids at the surface, the inhibitors interrupt the interaction between the shale and the water. The drilling fluids with shale inhibitor materials are then pumped to the thief zones to prevent the shale swelling. Inhibitor materials are expensive. Additionally, inhibitor materials have environmental limitations and pose problems for disposal.

Conventional methods of addressing loss of circulation and shale formations use different treatment systems. These different treatment systems incur costs and can take time to change back and forth between the two.

Therefore, a product that alters the physical structure of the formation without such drawbacks is desired.

SUMMARY

Compositions and methods are provided for modifying the physical structure of a formation surrounding a wellbore. More specifically, compositions and methods are provided for forming a polymeric composition in a wellbore, where the polymeric composition transforms an aspect of the wellbore formation.

In one aspect, a method of modifying an alteration zone of a formation near a wellbore using a non-Newtonian polymeric composition created from a reaction of a non-Newtonian combination is provided. The method includes the steps of mixing an anhydrous tetraborate and a fluid to create a crosslinker solution, where a concentration of anhydrous sodium tetraborate in the crosslinker solution is between 0.1% and 1.5% by volume, mixing a crosslinkable polyvinyl alcohol solution and a polyvinyl acetate solution to create a polymer solution, where a blend ratio of polyvinyl acetate to polyvinyl alcohol in the polymer solution is 45 to 1, where the polymer solution further comprises a carbohydrate, where the crosslinker solution and the polymer solution form the non-Newtonian combination, where a ratio of the anhydrous sodium to tetraborate to the crosslinkable polyvinyl alcohol in the non-Newtonian combination is between 1:3 and 1:5, delivering the non-Newtonian combination to a reaction zone in the wellbore, where the pumping of the non-Newtonian combination is configured such that the crosslinker solution is isolated from the polymer solution until the reaction zone, the reaction zone being defined as a point which allows the reaction between the crosslinker solution and the polymer solution to proceed to a completion time prior to reaching the alteration zone, the completion time being defined as the time to react substantially all of the crosslinker solution and the polymer solution, where pumping the non-Newtonian combination is configured to induce mixing of the polymer solution and the crosslinker solution, where a rate of dissolution of the polymer solution depends on the temperature in the reaction zone, allowing the non-Newtonian combination to react to form the non-Newtonian polymeric composition, allowing the non-Newtonian polymeric composition to migrate to the alteration zone, where the non-Newtonian polymeric composition migrates due to gravity, and allowing the non-Newtonian polymeric composition to interact with the alteration zone to modify the alteration zone.

In certain aspects, the alteration zone is a loss circulation zone with a loss of circulation. In certain aspects, the non-Newtonian polymeric composition molds to the shape of the loss circulation zone forming a seal which controls the loss of circulation in the loss circulation zone. In certain aspects, the alteration zone is a shale formation. In certain aspects, a ratio of anhydrous sodium tetraborate to the crosslinkable polyvinyl alcohol is 1:3 and 1:5. In certain aspects, a concentration of anhydrous sodium tetraborate in the crosslinker solution is between 0.1 percent by volume (% by volume) and 1.5% by volume. In certain aspects, a blend ratio of polyvinyl acetate to polyvinyl alcohol in the polymer solution is 45 to 1. In certain aspects, the reaction zone is at the distance from the alteration of between 200 feet and 500 feet. In certain aspects, the completion time is less than 30 minutes after contact in the reaction zone. In certain aspects, the fluid is a drilling fluid. In certain aspects, the drilling fluid is an aqueous-based drilling mud. In certain aspects, the alteration zone is indicated by a pressure drop in the wellbore. In certain aspects, the carbohydrate is selected from the group consisting of starch, sugars, and combinations of the same. In certain aspects, the carbohydrate includes a starch. In certain aspects, the carbohydrate includes a sugar selected from the group consisting of sucrose, lactose, maltose, and combinations of the same. In certain aspects, the carbohydrate is the sugar sucrose and the sucrose is present in the polymer solution in the range between 20.5 grams and 21.5 grams per 100 milliliters of polymer solution.

In a second aspect, a non-Newtonian combination for reacting to create a non-Newtonian polymeric composition in situ in a wellbore is provided. The non-Newtonian combination includes a crosslinker solution operable to undergo a reaction to crosslink a crosslinkable polymer in the wellbore, the crosslinker solution including anhydrous sodium tetraborate and a drilling fluid, where the reaction is operable to proceed to a completion point, a polymer solution operable to form the non-Newtonian polymeric composition in the wellbore when brought into contact with the crosslinker solution, the polymer solution including the crosslinkable polymer, a carbohydrate, and water, the crosslinkable polymer including polyvinyl alcohol and polyvinyl acetate.

In certain aspects, the completion point occurs less than 30 minutes after contact between the crosslinker solution and the polymer solution, the contact occurring in the wellbore. In certain aspects, a ratio of anhydrous sodium tetraborate to the crosslinkable polyvinyl alcohol is between 1:3 and 1:5. In certain aspects, a concentration of anhydrous sodium tetraborate in the crosslinker solution is between 0.1% and 1.5% by volume of the crosslinker solution. In certain aspects, a blend ratio of the polyvinyl acetate to polyvinyl alcohol is 45 to 1. In certain aspects, the drilling fluid is an aqueous-based drilling mud.

In a third aspect, a non-Newtonian combination includes anhydrous sodium tetraborate operable to crosslink polyvinyl alcohol, the anhydrous sodium tetraborate being present in a concentration between 0.1% and 1.5% by volume of the non-Newtonian combination, polyvinyl alcohol operable to form a crosslinked polymer, the polyvinyl alcohol being present in a concentration between 0.4% and 6% by volume, polyvinyl acetate, and a carbohydrate operable to increase the pour-ability of the non-Newtonian combination.

In certain aspects, the completion point occurs less than 30 minutes after contact between the anhydrous sodium tetraborate and the polyvinyl alcohol. In certain aspects, a ratio of anhydrous sodium tetraborate to polyvinyl alcohol is 1:3 and 1:5. In certain aspects, the anhydrous sodium tetraborate is mixed with a drilling fluid.

BRIEF DESCRIPTION OF THE DRAWINGS

These and other features, aspects, and advantages of embodiments will become better understood with regard to the following descriptions, claims, and accompanying drawings. It is to be noted, however, that the drawings illustrate only several embodiments and are therefore not to be considered limiting of the inventive scope as it can admit to other equally effective embodiments.

FIGS. 12a-c are pictorial representations of the results of Example 4.

DETAILED DESCRIPTION

Figure 1:
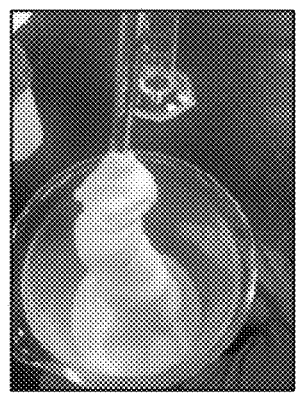
FIG. 1 is a pictorial representation of the twisting of the non-Newtonian polymeric composition.
Figure 2:
FIG. 2 is a pictorial representation of the stretching capability of the non-Newtonian polymeric composition.
Figure 3:
FIG. 3 is a pictorial representation of the stretching capability of the non-Newtonian polymeric composition.
Figure 4:
FIG. 4 is a pictorial representation of the stretching capability of the non-Newtonian polymeric composition.
Figure 5:
FIG. 5 is a pictorial representation of the non-Newtonian polymeric composition.
Figure 6:
FIG. 6 is a pictorial representation of the non-Newtonian polymeric composition.
Figure 7:
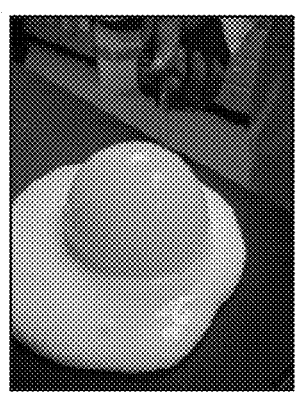
FIG. 7 is a pictorial representation of the swelling property of the non-Newtonian polymeric composition.

While the following detailed description will contain several embodiments, it is understood that one of ordinary skill in the relevant art will appreciate that many examples, variations and alterations to the apparatus and methods described are within the scope and spirit of the embodiments. Accordingly, the embodiments described are set forth without any loss of generality, and without imposing undue limitations.

The non-Newtonian polymeric composition is a material created in situ in the wellbore to modify an alteration zone. The non-Newtonian polymeric composition has distinctive properties: it stretches easily without breaking, takes the form of its container, acts as a barrier to water, and swells like a balloon if gas is blown inside it. The non-Newtonian polymeric composition is created from the non-Newtonian combination. The non-Newtonian combination includes the crosslinker solution and the polymer solution.

As used throughout, "alteration zone" refers to any area of a formation that requires treatments to improve wellbore or formation stability. Alteration zones can include loss circulation zones, shale formation zones, and combinations thereof.

As used throughout, "alteration event" refers to when the alteration zone is entered or encountered during drilling operations. An alteration event is signaled by a drop in pressure in the wellbore.

The crosslinker solution crosslinks the crosslinkable polymer. Examples of crosslinker solutions include crosslinking agents such as aluminum containing compounds, antimony containing compounds, zirconium containing compounds, titanium containing compounds, and boron containing compounds. In at least one embodiment, the boron containing compound is sodium tetraborate. In at least one embodiment, the crosslinker solution is a sodium tetraborate (borax) solution. The borax solution is created by mixing anhydrous sodium tetraborate ($Na_2B_4O_7$) with a fluid. The anhydrous sodium tetraborate can be any commercially available anhydrous sodium tetraborate. In certain embodiments, the borax solution is created by mixing hydrate forms of sodium tetraborate with the fluid. Hydrate forms of sodium tetraborate include the pentahydrate form ($Na_2B_4O_7.5H_2O$) and the decahydrate form ($Na_2B_4O_7.10H_2O$). The fluid can be any fluid capable of mixing with anhydrous sodium tetraborate to create the borax solution and of being injected into the wellbore. Examples of fluids include water, brine, and aqueous-based drilling fluids. In at least one embodiment, the fluid is an aqueous-based drilling mud. In at least one embodiment, the fluid is the same aqueous-based drilling fluid being used to drill the wellbore at the time of the alteration event. In at least one embodiment, the borax solution is created by stirring the anhydrous sodium tetraborate into the fluid. In at least one embodiment, mixing of the anhydrous sodium tetraborate and the fluid is achieved with the use of an agitator. In certain embodiments, the anhydrous sodium tetraborate is mixed with the fluid on site at the time of the alteration event. In at least one embodiment, the anhydrous sodium tetraborate is mixed with the fluid prior to the alteration event. In at least one embodiment of the present invent, the anhydrous sodium tetraborate is mixed with the fluid in a hopper system. In at least one embodiment, the mixing occurs in a cement truck. In at least one embodiment, the anhydrous sodium tetraborate is pumped downhole to the alteration zone and is mixed with the aqueous-based drilling fluid using a downhole agitator tool. In at least one embodiment, the borax solution is created off site from where the wellbore is being drilled. In at least one embodiment, excess anhydrous sodium tetraborate mixed with the fluid remains in the fluid. In embodiments where the fluid is an aqueous-based drilling fluid, anhydrous sodium tetraborate present in the aqueous-based drilling fluid does not change the efficacy of the aqueous-based drilling fluid. When the non-Newtonian polymeric composition is needed, the concentration of the polymer solution can be narrowly tailored to produce the reaction at the desired reaction rate to produce the non-Newtonian polymeric composition with the desired properties.

The concentration of the anhydrous sodium tetraborate in the borax solution is between about 0.1% by volume of the borax solution and about 1.5% by volume of the borax solution. The concentration of anhydrous sodium tetraborate in the borax solution is dependent on the type of fluid used, the temperature and pressure of the wellbore, and the mixing strength. As used throughout, "mixing strength" refers to how thoroughly or vigorously the borax solution is mixed. In at least one embodiment, the mixing strength of the borax solution refers to high shear mixing of the borax solution. The concentration of anhydrous sodium tetraborate in the borax solution effects the viscosity of the non-Newtonian polymeric composition. In at least one embodiment, the dissolution of the anhydrous sodium tetraborate in the borax solution occurs at surface temperatures. A greater rate of dissolution increases the spread of borate ion ($B(OH)_4$) in solution which increases the crosslinking of the crosslinkable polymer. The total volume of the borax solution depends upon the nature of the alteration zone. For example, the larger the alteration zone encountered, the more borax solution is needed. In at least one embodiment, the total volume of the borax solution can be in the range from about 10 barrels to about 100 barrels. In at least one embodiment, the total volume of borax solution mixed for pumping into the wellbore is 50 barrels.

The polymer solution contains the crosslinkable polymer that forms the non-Newtonian polymeric composition on contact with the crosslinker solution.

In at least one embodiment, the polymer solution is a polyvinyl blend solution, where the crosslinkable polymer is a mixture of polyvinyl alcohol (PVA) and polyvinyl acetate (PVAc). The polyvinyl blend is created by mixing a polyvinyl alcohol (PVA) solution and polyvinyl acetate (PVAc) solution in a blend ratio of PVAc to PVA. The blend ratio of PVAc to PVA in the polyvinyl blend solution is 45 to 1 by volume. The polyvinyl blend is crosslinkable.

The PVA solution is created by mixing powdered polyvinyl alcohol with hot water. The powdered polyvinyl alcohol can be any commercially available powdered polyvinyl alcohol (($C_2H_4O)_x$). In a preferred embodiment, distilled water is used to create the PVA solution. Mixing continues until all of the polyvinyl alcohol is dissolved. In at least one embodiment, the PVA solution is created by stirring the polyvinyl alcohol and the water. In at least one embodiment, the powdered polyvinyl alcohol is mixed with the water prior to the alteration event. In at least one embodiment, the powdered polyvinyl alcohol is mixed with the water at the time of the alteration event. In at least one embodiment, the PVA solution is created off site from where the wellbore is being drilled. In at least one embodiment, the PVA solution is a commercially available PVA solution. The concentration of the polyvinyl alcohol in the PVA solution is between about 0.4% by volume of PVA solution and about 6.0% by volume of PVA solution. The concentration of the PVA solution is dependent on the temperature and pressure of the wellbore. The rate of dissolution of polyvinyl alcohol depends on temperature. At increased temperatures a greater rate of polyvinyl alcohol dissolution in the water occurs to create the PVA solution, which results in a more homogenous final non-Newtonian polymeric composition. The polyvinyl alcohol is added to the water at an addition temperature and mixed until the polyvinyl alcohol is dispersed. The PVA solution is then heated to a dissolution temperature and mixed until the polyvinyl alcohol is dissolved. The addition temperature is between about 15 degrees Celsius (° C.) and about 55° C., alternately between about 20° C. and about 50° C., alternately between about 30° C. and about 40° C. The dissolution temperature is between about 70° C. and about 100° C., alternately between about 75° C. and about 95° C., and alternately between about 80° C. and about 90° C. In at least one embodiment, polyvinyl alcohol is added to water at an addition temperature of about 20° C. and mixed until the polyvinyl alcohol is dispersed. After the polyvinyl alcohol is fully dispersed, the temperature is increased to a constant dissolution temperature of about 80° C. with constant mixing until the polyvinyl alcohol is fully dissolved. In at least one embodiment, the dissolution temperature is 90° C.

The PVAc solution is created by mixing powered polyvinyl acetate with methanol. The PVAc can be any commercially available powered polyvinyl acetate. The concentration of the polyvinyl acetate in the PVAc solution is 53% by weight in methanol. Mixing continues until all of the polyvinyl acetate is dissolved. In at least one embodiment, the polyvinyl acetate is mixed with methanol prior to the alteration event. In at least one embodiment, the powdered polyvinyl acetate is mixed with the methanol at the time of the alteration event.

In at least one embodiment, the polymer solution is mixed in a vessel after the alteration event in a vessel near the wellbore, prior to being placed into the wellbore, as this ensures thorough mixing.

The polymer solution can include additives. Examples of additives include starch, emulsifier, and clay. The additives can increase the pourability and flexibility of the non-Newtonian polymeric composition. In at least one embodiment, the polymer solution includes starch as an additive.

The polymer solution can include carbohydrates as additives. The carbohydrates can be selected from sugar and starch. The starch can be any type of plant derived polysaccharide containing glucose. The starch can be added in an amount to maintain a ratio of PVA to starch of 2:1. The addition of starch can increase the pour-ability of the non-Newtonian polymeric composition.

Examples of sugar can include sucrose, lactose, maltose, and others. As used throughout, sugar refers to a disaccharide composed of two monosaccharides. In at least one embodiment, the polymer solution includes a sugar and the sugar is sucrose. The amount of sugar added to the polymer solution can be between 20.5 grams (g) and 21.9 g per 100 ml of the polymer solution and alternately between 20.9 g and 21.5 g per 100 ml of the polymer solution. Adding an amount of sugar greater than 22 g can result in a non-Newtonian polymeric composition that exhibits sporadic behavior. As used throughout, "sporadic behavior" or "sporadic" refers to a gel that separates from the liquid and moves away from a target zone. Adding an amount of sugar of less than 20 g can result in the non-Newtonian composition being isolated from the liquid in the solution. The addition of the sugar can increase the homogeneity of the non-Newtonian polymeric composition.

In at least one embodiment, the polymer solution includes both a starch and a sugar. In at least one embodiment, the polymer solution includes starch and sucrose, where the sucrose is added to the polymer solution in the amount of 21 g per 100 ml of the polymer solution and can result in a homogeneous non-Newtonian polymeric composition.

The total volume of the polymer solution depends upon the nature of the alteration zone. For example, the larger the alteration zone encountered, the more polymer solution is needed. In at least one embodiment, the total volume of polymer solution can be in the range from about 10 barrels to about 100 barrels. In at least one embodiment, the total volume of the polymer solution is 50 barrels. In at least one embodiment, where the polymer solution is a polyvinyl blend solution, the total volume of the polyvinyl blend solution is 50 barrels.

The concentrations of the polymer solution and crosslinker solution and the ratio of the polymer solution to the crosslinker solution produce a non-Newtonian polymeric composition having the properties desired. In at least one embodiment, maintaining the ratio of borate ions to polyvinyl ions is critical to achieving a non-Newtonian polymeric composition with the desired properties. The desired concentrations are determined based on the suspected size of the alteration zone in the absence of considerations of environmental impact because the non-Newtonian polymeric composition is environmentally friendly, the need for excess reactant, or which reactant is calculated first. The final concentration of the total volume of the crosslinker solution and the total volume of the polymer solution must be calculated to maintain a ratio of sodium tetraborate to polyvinyl alcohol in the range of between about 1:3 to about 1:5. In at least one embodiment, the ratio of sodium tetraborate to polyvinyl alcohol is 1:4. At a ratio of sodium tetraborate to polyvinyl alcohol of 1:4 neither component is in excess.

Figure 8:
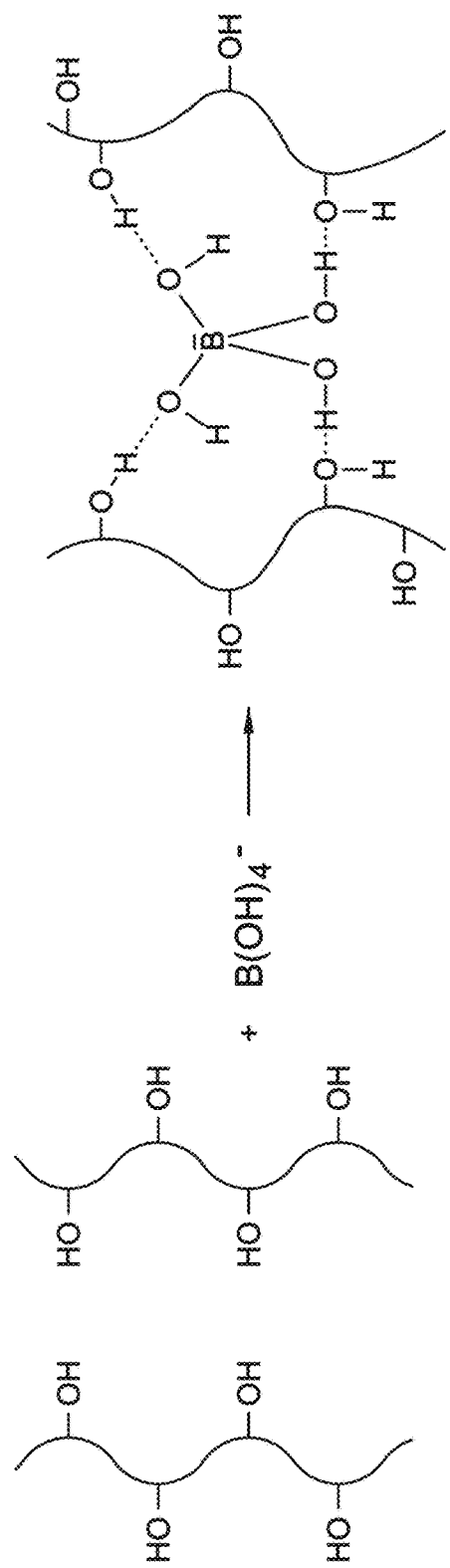
FIG. 8 is a pictorial representation of reaction between chains of polyvinyl alcohol and the borate ion.

The non-Newtonian polymeric composition formed from the reaction of the non-Newtonian combination, specifically the crosslinker solution and the polymer solution is a network of cross-linked chains that traps water and produces a gel. Sources for the trapped water include water from the aqueous-based drilling fluid and water from the non-Newtonian combination. The aqueous drilling fluid can mix with the crosslinker solution, the polymer solution, or combinations thereof before the reaction that forms the non-Newtonian polymeric composition. The reaction between the crosslinker solution and the polymer solution initiates at a rapid rate. The reaction between the crosslinker solution and polymer solution occurs in between about 1 and about 5 minutes, alternately between about 1 and about 4 minutes, alternately between about 1 and about 3 minutes, and alternately between about 1 and about 2 minutes. The reaction occurs in the absence of special reaction conditions. The reaction to form the non-Newtonian polymeric composition occurs in the absence of heating, catalysts, pressure, and extended time. Without being bound to a particular theory, it is believed that the mass of the non-Newtonian polymeric composition will twist and turn as hydrogen bonds form between the hydroxyl groups (—OH) on the borate ions and the hydrogen of the hydroxyl groups of the polyvinyl alcohol, see FIG. 8. The non-Newtonian polymeric composition stretches, conforms to the shape of its container, is waterproof, and swells like a balloon if a gas is blown into the non-Newtonian polymeric composition, see FIGS. 1-7.

In a method to alter an alteration zone of a formation, the non-Newtonian combination described forms the non-Newtonian polymeric composition when brought into contact in situ in the wellbore, where the reaction occurs to modify the alteration zone. Advantageously, the non-Newtonian polymeric composition is effective because it is sticky towards the rock surface and therefore more adhesive to cure the alteration event.

After obtaining the crosslinker solution and the polymer solution, the non-Newtonian combination is delivered to the reaction zone in the wellbore. The reaction zone is the point in the wellbore where the reaction of the non-Newtonian combination is initiated. The reaction zone can be at the alteration zone or can be at a distance before the alteration zone. Being at a distance before the alteration zone allows the non-Newtonian combination to migrate from the reaction zone to the alteration zone while reacting, so that the reaction between the crosslinker solution and the polymer solution proceeds to the completion point prior to reaching the alteration zone. In accordance with at least one embodiment, the reaction zone occurs in the range from about 50 feet to about 1000 feet before the alteration zone, alternately from about 100 feet to about 800 feet before the alteration zone, or alternately from about 200 feet to about 500 feet before the alteration zone. The reaction zone is defined based on the total volume of the non-Newtonian combination, the size of the alteration zone, and the temperature and pressure conditions in the wellbore. The completion point is the point in time at the end of the completion time. The completion time is the time it takes to react all or substantially all of the crosslinker solution and the polymer solution to create the non-Newtonian polymeric composition. The completion time is less than about 60 minutes, alternately less than about 30 minutes, alternately less than about 20 minutes, alternately less than about 10 minutes, alternately less than about 5 minutes, alternately less than about 4 minutes, alternately less than about 3 minutes, alternately less than about 2 minutes, or alternately less than about 1 minute. In at least one embodiment, the completion time is less than 30 minutes after the non-Newtonian combination makes contact in the reaction zone.

The non-Newtonian combination is delivered to the reaction zone by any known means capable of delivering a fluid from the surface to a depth of the wellbore, such that the crosslinker solution is isolated from the polymeric solution until the reaction zone. Examples of means for delivering the non-Newtonian combination to a depth of the wellbore include any manner in which drilling fluid can be delivered into the wellbore. Examples of means for delivering a drilling fluid to a wellbore include coiled tubing, open-end drill piping, piping and through the casing. In at least one embodiment, the non-Newtonian combination is delivered to the reaction zone via coil tubing runs. In at least one embodiment, the polymer solution is delivered through the casing in the wellbore in any manner in which drilling fluid is delivered into the wellbore, such as piping.

The order in which the polymeric solution and the crosslinker solution are delivered to the reaction zone does not affect the reaction between the two or the properties of the non-Newtonian polymeric composition. In at least one embodiment, the polymer solution is delivered to the reaction zone after the entire volume of the crosslinker solution is delivered to the reaction zone. In at least one embodiment, the crosslinker solution is delivered to the reaction zone after the entire volume of the polymer solution is delivered to the reaction zone. In at least one embodiment, the crosslinker solution and the polymer solution are delivered to the reaction zone during the same time frame, by separate piping systems, such as an open-ended drill pipe or coil tubing. The non-Newtonian combination is not delivered to the reaction zone by the same piping system at the same time. The method to alter an alteration zone of a formation is in the absence of the non-Newtonian combination being mixed on a surface and pumped to the reaction zone together. By delivering the crosslinker solution and polymer solution separately to the reaction zone, the reaction is delayed, which ensures that the completion point is reached at or near the alteration zone and avoids blocking fractures or other points in the wellbore that should not be blocked.

The pumping of the non-Newtonian combination occurs at a rate that induces mixing of the polymer solution and the crosslinker solution in the reaction zone. The mixing of the polymer solution with the crosslinker solution provides the necessary contact between the polymer solution and the crosslinker solution to form the non-Newtonian polymeric composition. The reaction fails to proceed at temperatures above 120° C. and alternately above 150° C.

After delivery of the non-Newtonian combination to the reaction zone, the crosslinker solution and the polymer solution react to form the non-Newtonian polymeric composition. In at least one embodiment, the non-Newtonian combination reacts in the reaction zone. In at least one embodiment, the non-Newtonian combination reacts while migrating from the reaction zone to the alteration zone. In at least one embodiment, the time it takes for the reacting non-Newtonian combination to migrate from the reaction zone is less than the completion time. The non-Newtonian combination migrates due to gravity. In at least one embodiment, the non-Newtonian polymeric composition forms in one mass.

When the alteration zone is a loss circulation zone, the non-Newtonian polymeric composition operates to control the loss of circulation. In at least one embodiment, the non-Newtonian polymeric composition molds to the shape of the loss circulation zone forming a seal. The seal controls loss circulation. In at least one embodiment, the non-Newtonian combination forms a mesh-like consistency that attaches to the rock of the wellbore and plugs the loss circulation zone minimizing the fluid loss.

When the alteration zone is a shale formation, the non-Newtonian polymeric composition operates to prevent the interaction between shale and water. In at least one embodiment, the non-Newtonian polymeric composition adheres to a shale formation preventing the interaction of water in the aqueous drilling fluid and the shale. The non-Newtonian polymeric composition prevents the swelling of the shale formations and the dispersion of shale into the drilling fluid. Without being bound to a specific theory, it is believed that the non-Newtonian polymeric composition plugs pores of a shale formation by forming a thin film. A portion of the non-Newtonian polymeric composition can adhere to the surface of the shale formation, while the remaining mass of the non-Newtonian polymeric composition can slide or move on finding other points of the shale formation to adhere on to, thus forming a film from a mass of the non-Newtonian polymeric composition. It is understood that the adhesion of the non-Newtonian polymeric composition to the shale is facilitated by the fact that shale is hydrophilic and thus is attracted to the water in the non-Newtonian polymeric composition. The water that would otherwise interact with the shale is encapsulated in the cross-linked polymer of the non-Newtonian polymeric composition.

EXAMPLES

Example 1

A PVA solution of 4% by weight polyvinyl alcohol was prepared by weighing 40 g of powdered polyvinyl alcohol and adding it to 1 L distilled water at 50° C. The PVA solution was then heated to 90° C. until the polyvinyl alcohol was completely dissolved. The PVA solution was mixed with a PVAc solution to create a polymer solution and maintain a blend ratio of PVAc to PVA of 45 to 1. A borax solution of 4% by weight borax was prepared by weighing 40 g anhydrous sodium tetraborate and stirring it into 1 L distilled water. To create the non-Newtonian polymeric composition, 100 mL of the borax solution was added to 400 mL of the polymer solution. Within seconds a white polymeric substance was formed. The polymer formed on the end of the stirrer and began to twist and turn. Without being bound to a particular theory, it is believed that the strands twisted and turned as hydrogen bonds formed between the hydroxyl groups (—OH) on the borate ions and the polyvinyl alcohol. At this point, the non-Newtonian polymeric composition was ready and could be isolated from its liquid media. The non-Newtonian polymeric composition stretches, conforms to the shape of its container, is waterproof, and swells like a balloon if a gas is blown into the non-Newtonian polymeric composition, see FIGS. 1-7.

Example 2

Figure 9:
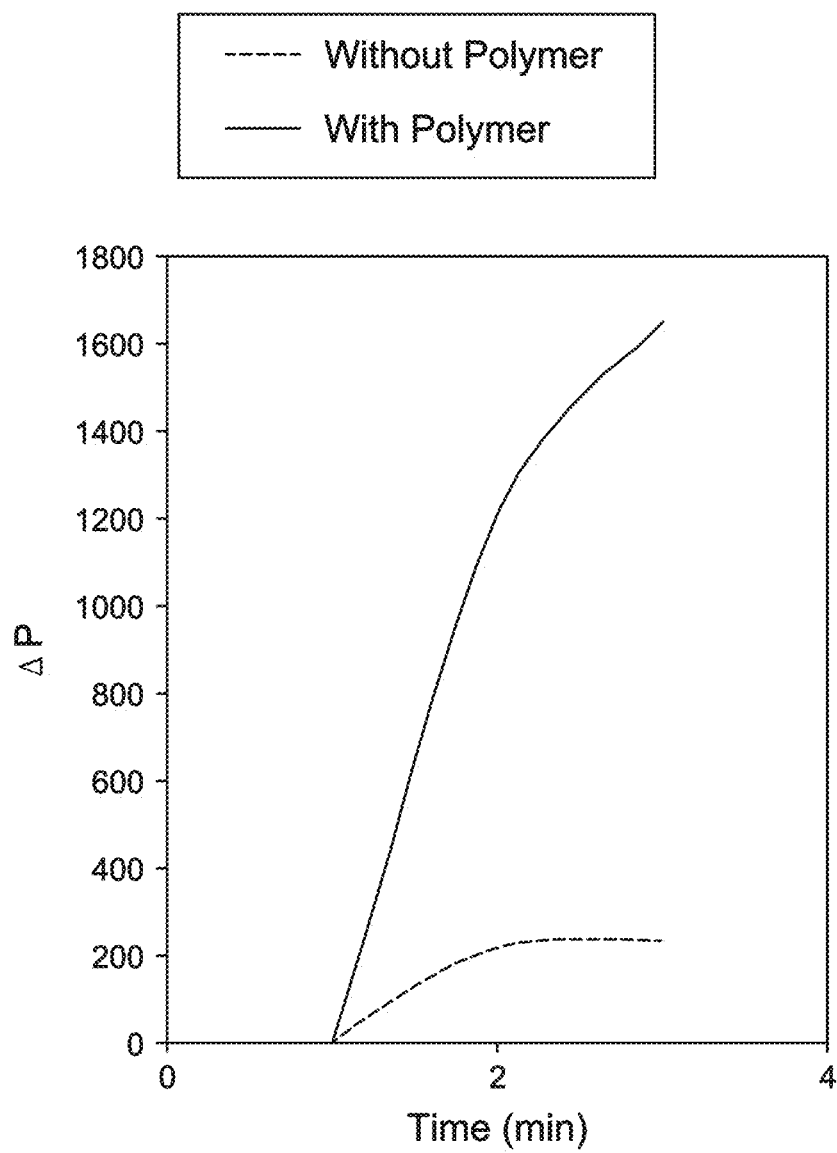
FIG. 9 is a graph of the differential pressure of a shale plug and a coated shale plug.
Figure 10A:
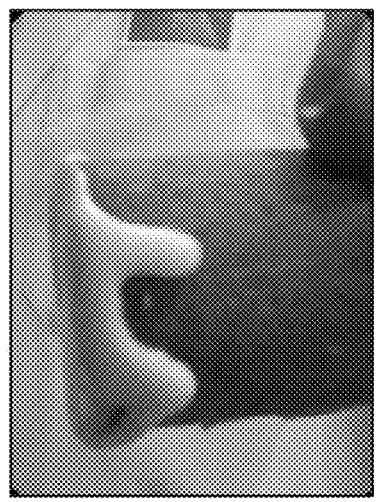
FIGS. 10a-c are pictorial representations of a shale plug that is coated on one end with the non-Newtonian polymeric composition.
Figure 10B:
Figure 10C:

The ability of the non-Newtonian polymeric composition to adhere to and encapsulate shale was tested. The first test tested a differential pressure test in a core flood system of a shale plug. The shale plug along was found to have a pressure drop of about 200 psi. A sample of the non-Newtonian polymeric composition of Example 1 was coated around one end of the shale plug. The non-Newtonian polymeric composition was allowed to dry on the end of the shale plug, see FIG. 10. The coated shale plug was tested and found to have a pressure drop of about 1600 psi. The increased pressure drop in the shale plug coated with the non-Newtonian polymeric composition shows the impermeable film that the non-Newtonian polymeric composition forms that prevented the flow of fluids from one end of the coated plug to the other end, see FIG. 9.

Figure 11:
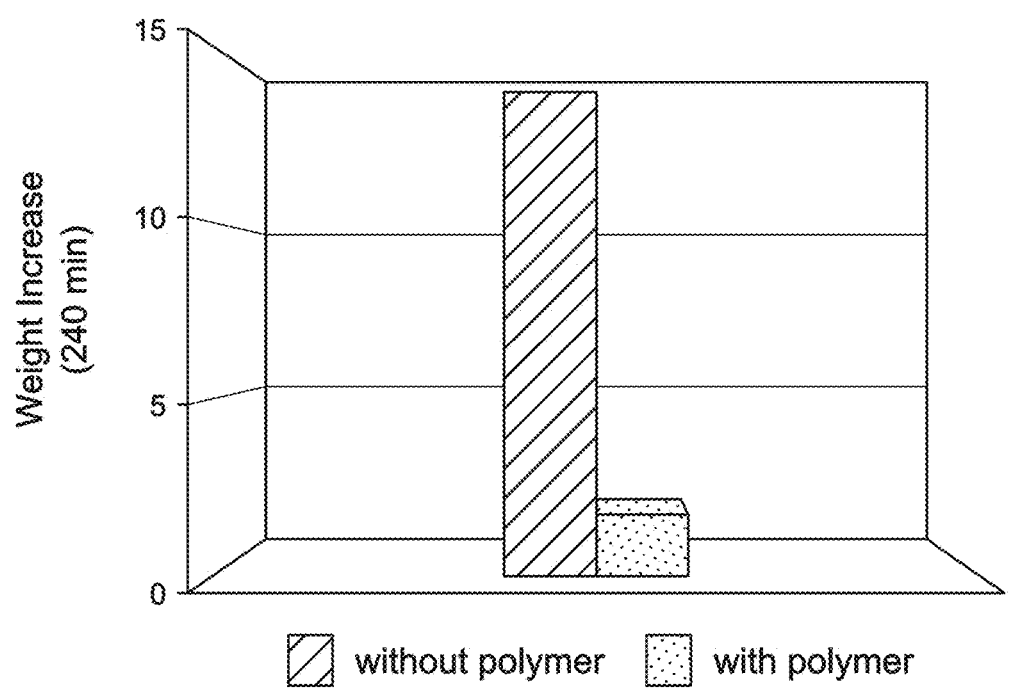
FIG. 11 is a graph of the change in weight of a shale plug and a coated shale plug that have been immersed in brine.

In a second test, a shale plug was weighed and the dimensions were measured. The shale plug was then submerged in 10% brine solution for three hours. The shale plug was removed from the brine and re-weighed and the dimensions were again measured. The test was repeated for a shale plug coated entirely in the non-Newtonian polymeric composition. After being submerged for three hours, the coated shale plug showed no change in weight or dimensions. The results indicate that the non-Newtonian polymeric composition inhibited the shale plug and prevented water molecules from invading the shale plug, see FIG. 11.

Example 3

After a loss circulation zone is discovered, 50 barrels of 4% by volume borax solution would be mixed with an additional 2000 barrels of drilling mud at the surface using an agitator at low speed. The resulting 50 barrels of borax solution have a concentration of 0.1% by volume borax solution. A pill of 50 barrels of the 0.1% by volume borax solution would then be pumped to the reaction zone.

At the same time, 50 barrels of 4% by volume PVA solution is injected through a separate drill pipe to the reaction zone. In this case, the reaction zone is 500 feet uphole of the loss circulation zone. It is predicted that within 30 minutes, the pressure in the wellbore will return to pre-loss circulation levels, indicating that the non-Newtonian polymeric composition has sealed all or substantially all of the loss circulation zone.

Example 4

A polymer solution containing 70 mL of polyvinyl blend solution of polyvinyl alcohol and polyvinyl acetate is mixed with 30 mL water. A crosslinker solution was created by mixing 7 g of sodium tetraborate solution with 310 mL water.

In a first sample, 21 g of the sugar sucrose was added to the fluid and mixed. The resulting non-Newtonian polymeric composition is shown in FIG. 12*a*. The non-Newtonian composition was homogeneous.

In a second sample, 20 g of the sugar sucrose was added to the fluid and mixed. The resulting non-Newtonian polymeric composition is shown in FIG. 12*b*. The non-Newtonian composition exhibited sporadic behavior.

In a third sample, 22 g of the sugar sucrose was added to the fluid and mixed. The resulting non-Newtonian polymeric composition is shown in FIG. 12*c*. The non-Newtonian composition became isolated from the liquid.

Although the present embodiments have been described in detail, it should be understood that various changes, substitutions, and alterations can be made hereupon without departing from the principle and scope of the embodiments. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from about one particular value to about another particular value. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

What is claimed is:

1. A method of modifying an alteration zone of a formation near a wellbore using a non-Newtonian polymeric composition created from a reaction of a non-Newtonian combination, the method comprising the steps of:

mixing an anhydrous sodium tetraborate and a fluid to create a crosslinker solution, wherein a concentration of anhydrous sodium tetraborate in the crosslinker solution is between 0.1% and 1.5% by volume;

mixing a crosslinkable polyvinyl alcohol solution and a polyvinyl acetate solution to create a polymer solution, wherein a blend ratio of polyvinyl acetate to polyvinyl alcohol in the polymer solution is 45 to 1, wherein the polymer solution further comprises a carbohydrate, wherein the carbonhydrate comprises a starch, wherein a ratio of polyvinyl alcohol to starch is 2:1, wherein the carbohydrate further comprises a sugar, wherein the sugar comprises sucrose, wherein the crosslinker solution and the polymer solution form the non Newtonian combination, wherein a ratio of anhydrous sodium tetraborate to the crosslinkable polyvinyl alcohol in the non-Newtonian combination is between 1:3 and 1:5;

delivering the non-Newtonian combination to a reaction zone in the wellbore, wherein delivering the non-Newtonian combination is configured such that the crosslinker solution is isolated from the polymer solution until the reaction zone, the reaction zone being defined as a point which allows the reaction between the crosslinker solution and the polymer solution to proceed to a completion time prior to reaching the alteration zone, the completion time being defined as the time to react substantially all of the crosslinker solution and the polymer solution, wherein delivering the non-Newtonian combination is configured to induce mixing of the polymer solution and the crosslinker solution, wherein a rate of dissolution of the polymer solution depends on the temperature in the reaction zone;

allowing the non-Newtonian combination to react to form the non-Newtonian polymeric composition;

allowing the non-Newtonian polymeric composition to migrate to the alteration zone, wherein the non-Newtonian polymeric composition migrates due to gravity; and allowing the non-Newtonian polymeric composition to interact with the alteration zone t-modify the alteration zone.

2. The method of claim 1, wherein the alteration zone is a loss circulation zone with a loss of circulation.

3. The method of claim 2, wherein the non-Newtonian polymeric composition molds to the shape of the loss circulation zone forming a seal which controls the loss of circulation in the loss circulation zone.

4. The method of claim 1, wherein the completion time is less than 30 minutes after contact in the reaction zone.

5. The method of claim 1, wherein the fluid is a drilling fluid.

6. The method of claim 5, wherein the drilling fluid is an aqueous-based drilling mud.

7. The method of claim 1, wherein the sucrose is present in the polymer solution in the range between 20.5 g and 21.5 g per 100 mL of polymer solution.

8. A method of modifying an alteration zone of a formation near a wellbore using a non-Newtonian polymeric composition created from a reaction of a non-Newtonian combination, the method comprising the steps of:

mixing an anhydrous sodium tetraborate and a fluid to create a crosslinker solution, wherein a concentration of anhydrous sodium tetraborate in the crosslinker solution is between 0.1% and 1.5% by volume;

mixing a crosslinkable polyvinyl alcohol solution and a polyvinyl acetate solution to create a polymer solution, wherein a blend ratio of polyvinyl acetate to polyvinyl alcohol in the polymer solution is 45 to 1, wherein the polymer solution further comprises a carbohydrate, wherein the carbonhydrate comprises a starch, wherein a ratio of polyvinyl alcohol to starch is 2:1, wherein the carbohydrate further comprises a sugar, wherein the sugar comprises lactose, wherein the crosslinker solution and the polymer solution form the non-Newtonian combination, wherein a ratio of anhydrous sodium tetraborate to the crosslinkable polyvinyl alcohol in the non-Newtonian combination is between 1:3 and 1:5;

delivering the non-Newtonian combination to a reaction zone in the wellbore, wherein delivering the non-Newtonian combination is configured such that the crosslinker solution is isolated from the polymer solution until the reaction zone, the reaction zone being defined as a point which allows the reaction between the crosslinker solution and the polymer solution to proceed to a completion time prior to reaching the alteration zone, the completion time being defined as the time to react substantially all of the crosslinker solution and the polymer solution, wherein delivering the non-Newtonian combination is configured to induce mixing of the polymer solution and the crosslinker solution, wherein a rate of dissolution of the polymer solution depends on the temperature in the reaction zone;

allowing the non-Newtonian combination to react to form the non-Newtonian polymeric composition;

allowing the non-Newtonian polymeric composition to migrate to the alteration zone, wherein the non-Newtonian polymeric composition migrates due to gravity; and allowing the non-Newtonian polymeric composition to interact with the alteration zone to modify the alteration zone.

9. The method of claim 8, wherein the alteration zone is a loss circulation zone with a loss of circulation.

10. The method of claim 9, wherein the non-Newtonian polymeric composition molds to the shape of the loss circulation zone forming a seal which controls the loss of circulation in the loss circulation zone.

11. The method of claim 8, wherein the completion time is less than 30 minutes after contact in the reaction zone.

12. The method of claim 8, wherein the fluid is a drilling fluid.

13. The method of claim 2, wherein the drilling fluid is an aqueous-based drilling mud.

14. A method of modifying an alteration zone of a formation near a wellbore using a non-Newtonian polymeric composition created from a reaction of a non-Newtonian combination, the method comprising the steps of:

mixing an anhydrous sodium tetraborate and a fluid to create a crosslinker solution, wherein a concentration of anhydrous sodium tetraborate in the crosslinker solution is between 0.1% and 1.5% by volume;

mixing a crosslinkable polyvinyl alcohol solution and a polyvinyl acetate solution to create a polymer solution, wherein a blend ratio of polyvinyl acetate to polyvinyl alcohol in the polymer solution is 45 to 1, wherein the polymer solution further comprises a carbohydrate, wherein the carbonhydrate comprises a starch, wherein a ratio of polyvinyl alcohol to starch is 2:1, wherein the carbohydrate further comprises a sugar, wherein the sugar comprises maltose, wherein the crosslinker solution and the polymer solution form the non-Newtonian combination, wherein a ratio of anhydrous sodium tetraborate to the crosslinkable polyvinyl alcohol in the non-Newtonian combination is between 1:3 and 1:5;

delivering the non-Newtonian combination to a reaction zone in the wellbore, wherein delivering the non-Newtonian combination is configured such that the crosslinker solution is isolated from the polymer solution until the reaction zone, the reaction zone being defined as a point which allows the reaction between the crosslinker solution and the polymer solution to proceed to a completion time prior to reaching the alteration zone, the completion time being defined as the time to react substantially all of the crosslinker solution and the polymer solution, wherein delivering the non-Newtonian combination is configured to induce mixing of the polymer solution and the crosslinker solution, wherein a rate of dissolution of the polymer solution depends on the temperature in the reaction zone;

allowing the non-Newtonian combination to react to form the non-Newtonian polymeric composition;

allowing the non-Newtonian polymeric composition to migrate to the alteration zone, wherein the non-Newtonian polymeric composition migrates due to gravity; and allowing the non-Newtonian polymeric composition to interact with the alteration zone to modify the alteration zone.

15. The method of claim 14, wherein the alteration zone is a loss circulation zone with a loss of circulation.

16. The method of claim 15, wherein the non-Newtonian polymeric composition molds to the shape of the loss circulation zone forming a seal which controls the loss of circulation in the loss circulation zone.

17. The method of claim 14, wherein the completion time is less than 30 minutes after contact in the reaction zone.

18. The method of claim 14, wherein the fluid is a drilling fluid.

19. The method of claim 18, wherein the drilling fluid is an aqueous-based drilling mud.

* * * * *

UNITED STATES PATENT AND TRADEMARK OFFICE
CERTIFICATE OF CORRECTION

PATENT NO.         : 10,435,614 B2
APPLICATION NO.    : 16/414401
DATED              : October 8, 2019
INVENTOR(S)        : Abeer Mohammad Al-Olayan Page 1 of 1

It is certified that error appears in the above-identified patent and that said Letters Patent is hereby corrected as shown below:

In the Claims

In Claim 1, Column 12, Line 57, the claim language reads: "form the non Newtonian combination," - It should read: "form the non-Newtonian combination,";

In Claim 1, Column 13, Line 18, the claim language reads: "with the alteration zone t-modify" - It should read: "with the alteration zone to modify"; and In Claim 13, Column 14, Line 26, the claim language reads: "The method of claim 2," - It should read: "The method of claim 12,".

Signed and Sealed this
Thirty-first Day of December, 2019

Andrei Iancu
*Director of the United States Patent and Trademark Office*